Figure 1:
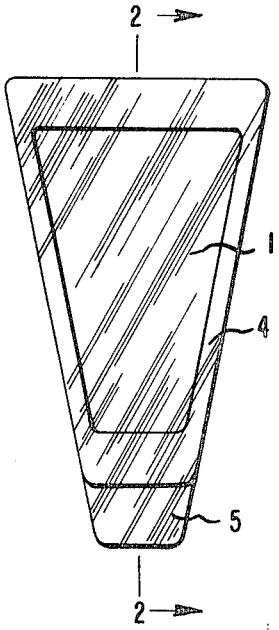
Figure 2:
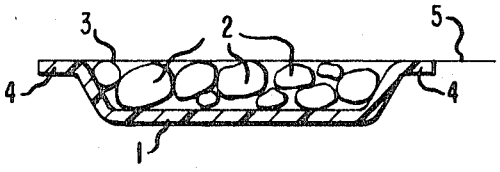
Figure 3:
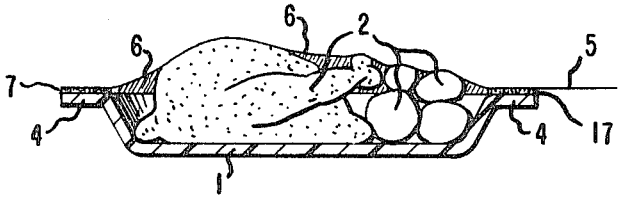

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 7, 1972

896 O.G. 19

T896,016
FOOD PACKAGE

Roland Gordon Harris, Chadds Ford, Pa., assignor to E. I. du Pont de Nemours and Company, Wilmington, Del.

Continuation of abandoned application Ser. No. 838,485, July 2, 1969. This application Jan. 14, 1971, Ser. No. 106,572

Int. Cl. B65b *9/04*
U.S. Cl. 99—171 LP
1 Sheet Drawing. 10 Pages Specification

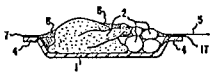

A sealed package useful in packaging, storing and vending foodstuffs consisting essentially of (a) a tray having a bottom panel with side walls and a continuous outwardly extending flange having a width of at least ¼-inch connected to the upper edge of the side wall wherein the tray is prepared from a foam composite of
  (1) a core of oriented closed cell foam having an elongation of less than about 50% consisting essentially of styrene polymer having a tensile modulus greater than 150,000 p.s.i., and
  (2) a thermoplastic film preferably polyvinyl chloride or unoriented butadiene-modified polystyrene bonded to both sides of the core wherein the thermoplastic film has a tensile modulus greater than 150,000 p.s.i., an elongation percentage greater than 5% and is thermoformable within a temperature range of about 50° to 230° C.;

(b) a foodstuff contained in the tray; and (c) a polymeric film having a thickness of about 1 to 10 mils prepared from polymers such as polyesters, polyolefins, regenerated cellulose, and elastomeric polymeric films attached to the outwardly extending flange of the tray with a heat-sealed adhesive, preferably an ethylene/vinyl acetate or an ethylene/vinyl acetate-wax blend adhesive having a bond strength of about 150 to 200 grams wherein the polymeric film cover has a tab portion extending beyond at least a portion of the perimeter of the flange with the remainder of the cover substantially coextensive with the remainder of the perimeter of the flange.

The package provides good hermetic protection for its food contents thereby significantly reducing the possibilities of spoilage and dehydration. The tab portion of the polymeric film cover over the tray provides easy opening of the package by pulling on the tab and the tray exhibits improved cut-through and puncture resistance, making it useful as an eating utensil.

March 7, 1972 R. G. HARRIS T896,016

FOOD PACKAGE

Filed Jan. 14, 1971

INVENTOR
ROLAND G. HARRIS

BY Donald W. Huntley
ATTORNEY